I. ILIEFF.
HORSESHOEING JACK.
APPLICATION FILED JULY 12, 1919.

1,330,807.

Patented Feb. 17, 1920.
2 SHEETS—SHEET 1.

Witness

Inventor
I. Ilieff.

By
Attorneys.

I. ILIEFF.
HORSESHOEING JACK.
APPLICATION FILED JULY 12, 1919.
1,330,807.
Patented Feb. 17, 1920.
2 SHEETS—SHEET 2.
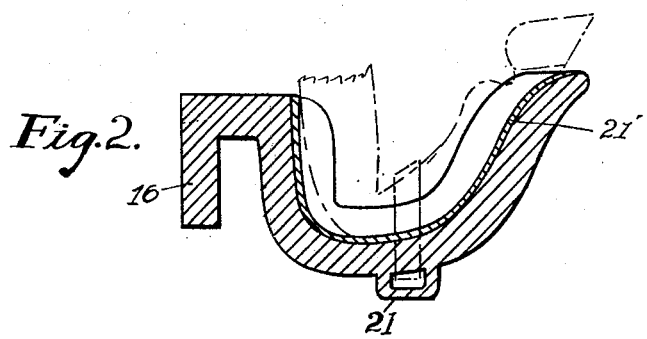
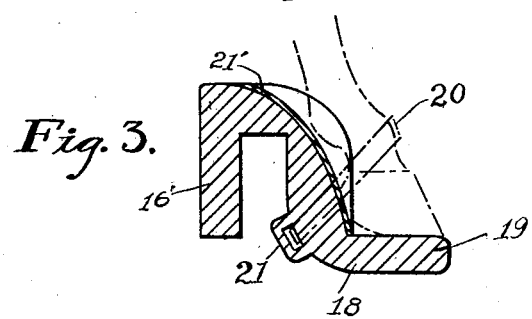
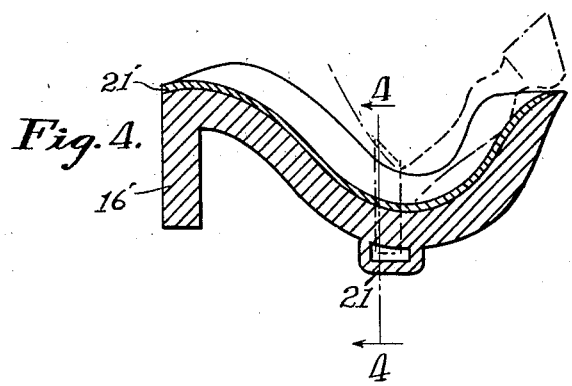
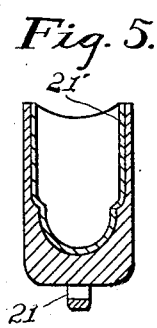

UNITED STATES PATENT OFFICE.

ILION ILIEFF, OF DETROIT, MICHIGAN.

HORSESHOEING-JACK.

1,330,807.   Specification of Letters Patent.   Patented Feb. 17, 1920.

Application filed July 12, 1919. Serial No. 310,392.

*To all whom it may concern:*

Be it known that I, ILION ILIEFF, a citizen of the United States, residing at Detroit, in the county of Wayne and State of Michigan, have invented a new and useful Horseshoeing-Jack, of which the following is a specification.

The present invention is a horseshoeing jack, its principal object being to provide an extensible jack to be engaged with the leg of a horse or other draft animal to support the same in elevated position so that the hoof will be disposed in position to be shod conveniently.

A further object of this invention is to provide an extensible standard or jack for retaining either one of the rear or fore legs of the animal in shoeing position and which includes attachments, one of which being of a shape to conform to the animal's fore leg, the other being of a shape to conform to the animal's hind leg, and a hoof supporting member to support the hoof in position for finishing or trimming.

Still another object of the invention is to provide a device of this character which will effectively support any one of the animal's legs in raised position, and which will not endanger or injure the animal in any way.

Another general object of the invention is to provide a horseshoeing device having the above characteristics which is simple in construction, which consists of few parts, and which may be manufactured and sold at minimum cost.

With the above and other objects and advantages in mind, the invention consists of the combinations of elements, constructions and arrangements of parts, operations and general assemblage all of which will be hereinafter enlarged upon and set forth in the appended claims, the invention being illustrated in the attached drawings, wherein:—

Fig. 2 is a vertical longitudinal sectional view of the fore-leg supporting attachment removed from the movable standard of the jack;

Fig. 3 is a vertical sectional view of the foot supporting attachment to be mounted in the movable standard;

Fig. 4 is a vertical longitudinal sectional view of the hind-leg supporting attachment;

Fig. 5 is a vertical transverse section view of the same taken on line 4—4 of Fig. 4.

Figure 1:
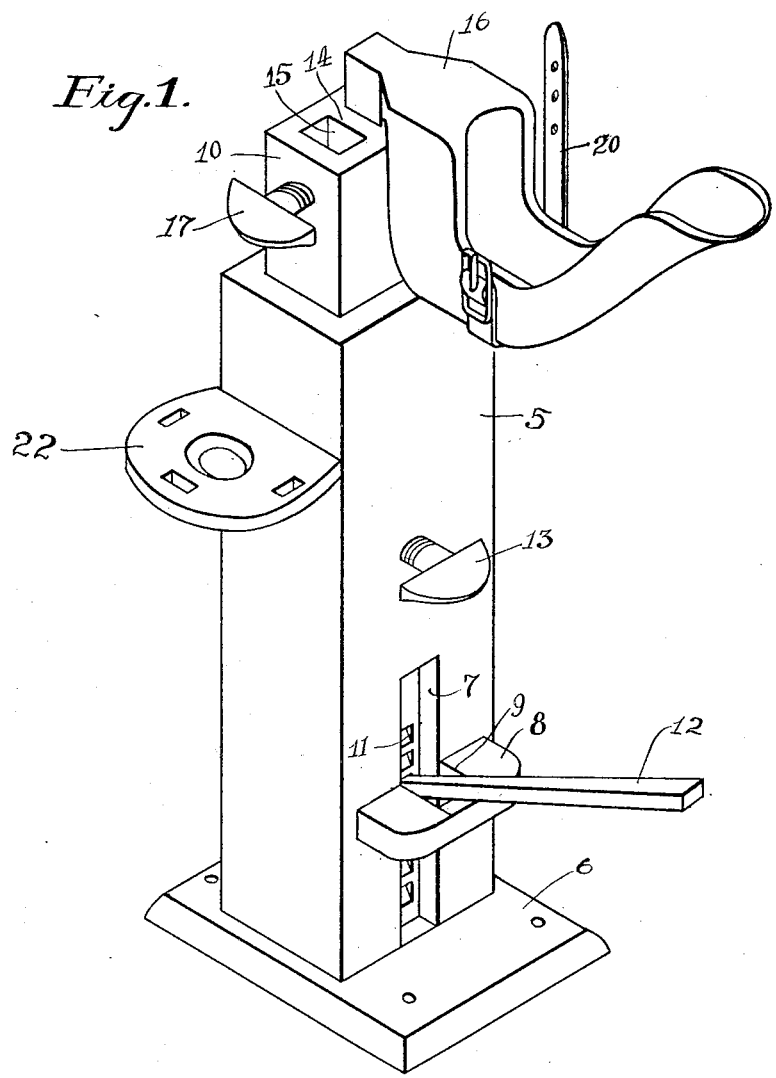
Figure 1 is a perspective of my improved horseshoeing device in operative position, the fore-leg supporting attachment being assembled with the device.

Referring to the drawing in detail, there is provided a rectangular cross-section tubular standard 5 mounted upon a base 6 which is adapted to be bolted or otherwise fixed to the floor. This standard 5 is provided with a vertical slot 7 in the lower end thereof, and cast with or otherwise secured to the standard 5 at the edges of the slot is a fulcrum plate 8 provided with an opening 9 which is disposed in alinement with the slot 7.

Received in the standard 5 and vertically adjustable therein is a lifting standard 10 which is tubular and is of rectangular cross-section formation. The standard 10 is provided with vertically alined teeth or notches 11 which are disposed in alinement with the slot 7. A lever or bar 12 is provided for lifting the standard 10, the inner end of this bar being beveled and adapted to engage with the notches in the standard 10, step by step, the lever extending through the plate 8 and fulcrumed on this plate as illustrated in Fig. 1. A set-screw 13 is provided which extends through the standard 5, engages the standard 10 and retains the latter in adjusted position. Extending longitudinally of the standard 10 is a web 14 that affords sockets 15.

A pair of leg receiving and holding members are provided, one for either of the front legs, while the other is adapted to one of the hind legs. The construction of both of these members is the same but the shape thereof is such as to accommodate the front and hind legs respectively. These limb supporting and retaining members consist each of a transversely curved channel-shaped member 16 which is shaped to conform to either the front or hind legs of the animal. The front leg-retaining member is formed with an L-shaped shank at the forward end thereof which is engageable within one of the sockets 15, the hind leg member illustrated in Fig. 4 is formed with a downwardly extended shank 16' which is also engageable in one of the sockets 15. Set-screws 17 are carried by the movable standard 10 and are engageable with the shanks of these leg-supporting members to retain the same in position. In order to retain the horse's hoof in a position facing the ground to finish or file the shoe, a channel-shaped member 18 is provided which terminates in a horizontally-disposed hoof rest 19 which is of a smaller diameter than the hoof so that the edges of the hoof will project slightly beyond the edges of the rest 19.

Straps 20 are provided with each of the channel-shaped members which extend through yokes 21 and are adapted to encircle the animal's limb and secure the same in position. In order to prevent the animal from injuring its limbs the interior of the channel-shaped members are faced with padding as indicated at 21'.

From the foregoing it will be seen that while the limb-supporting member is positioned in one of the sockets 15, the hoof-supporting member 18 may be positioned in the other socket member.

A tray 22 may be cast integral with or attached to one side of the standard 5 which is adapted to retain nails and the like.

The embodiment of the invention is illustrative only, and it will be understood that the same may be modified in many respects and that such limits of modification are only governed by what is claimed.

What is claimed is:

1. In a shoeing stand, a stationary standard, a vertically adjustable standard operating therein, said stationary standard having a slot formed in one of the side walls thereof, a plate secured to the stationary standard adjacent the slot thereof, said vertically adjustable standard having notches, a removable bar contacting with the plate and having one of its ends extending through the slot and coöperating with one of the notches of the vertically adjustable standard for causing movement of the vertically adjustable standard, said vertical standard having sockets formed in the upper end thereof, and removable supporting members having connection with the walls of the sockets of the vertically adjustable standard.

2. In a shoeing stand, a vertically movable standard, a stationary standard housing the vertically movable standard, means for causing vertical movement of the vertically movable standard with relation to the stationary standard, said vertically movable standard having sockets formed in the upper end thereof, holders, each of said holders having a curved limb-engaging portion and having a relatively straight shank adapted to be positioned within one of the respective openings, said vertically movable standard adapted to support a plurality of holders simultaneously, and means for securing the holders on the standard.

In testimony that I claim the foregoing as my own, I have hereto affixed my signature in the presence of a witness.

ILION ILIEFF.

Witness:
   Ivy E. Simpson.